Oct. 24, 1933.                J. W. McQUAID                1,931,900
                             AUTOMATIC LOCK NUT
                             Filed June 6, 1931
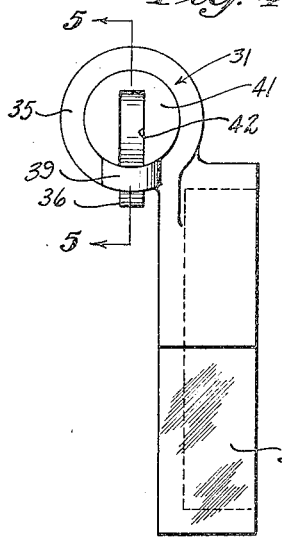
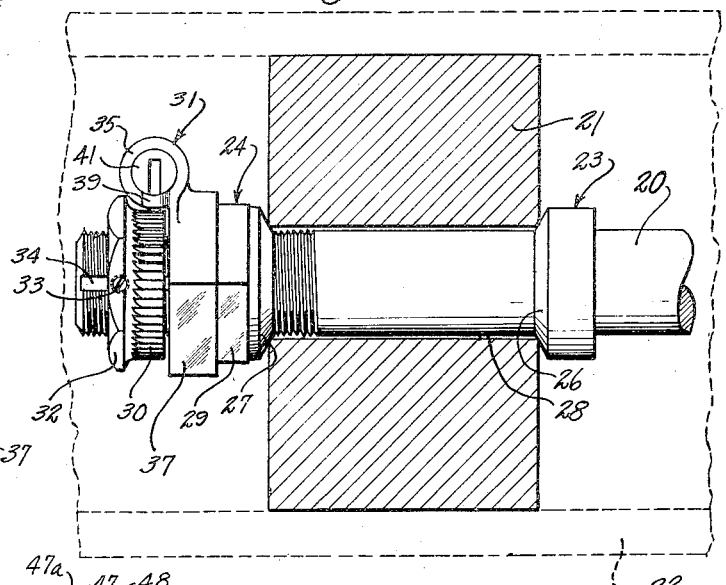
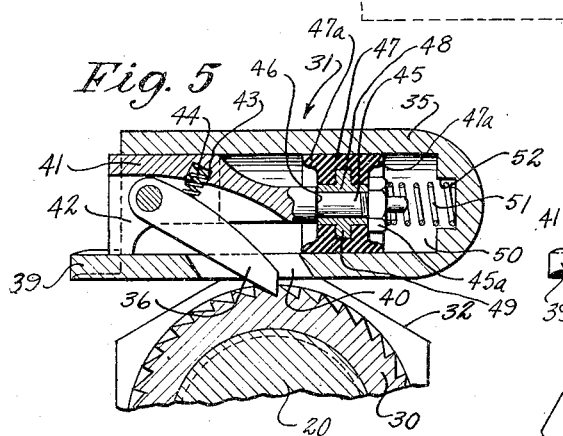
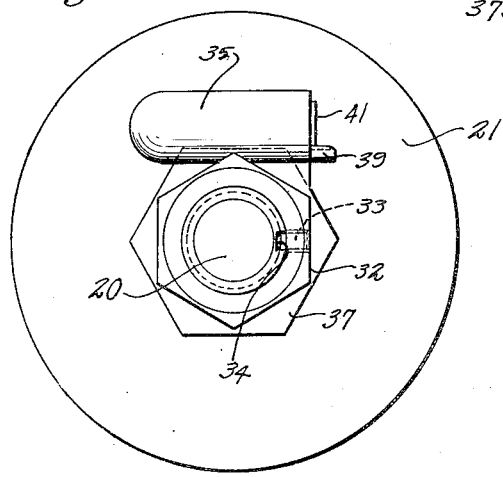
*Inventor*
John W. McQuaid.
*Attorney.*

Patented Oct. 24, 1933

1,931,900

UNITED STATES PATENT OFFICE 1,931,900

AUTOMATIC LOCK NUT

John W. McQuaid, Torrance, Calif.

Application June 6, 1931. Serial No. 542,571

27 Claims. (Cl. 309—4)

My invention relates to the piston construction of pumps, engines and the like, particularly to means for securing a piston head to a piston rod, and more particularly refers to automatic means for insuring a continuously efficient attachment of a removable piston head to a piston rod.

My invention may be broadly described as comprising a keeper movably carried by the piston rod to engage the piston head and fluid-pressure-actuated means for advancing the keeper on the piston rod in the direction of increasingly efficient engagement with the piston head. The actuating means derives its power from the fluid pressure in the cylinder enclosing the piston head, and is constructed without valves to be automatically operated by variations in that fluid pressure occurring as pulsations with the reciprocation of the piston.

The total strain from pressure exerted against the face of the piston is concentrated at the joint between the piston head and the piston rod, and, even in low pressure cylinders, the thrust exerted by the piston head against the piston rod is of relatively great magnitude. In high pressure cylinders, this thrust may amount to several tons. In single-action cylinders, the thrust is exerted as a relatively rapid pulsating force in one direction, and in double-action cylinders, the thrust is exerted as a relatively rapid pulsating force alternating in two directions; consequently, the piston tends to develop "play" between the piston head and the means securing the piston head to the piston rod, and, because of the magnitude of the forces involved, the wear upon the parts affected increases rapidly even in the case of the hardest metal. My invention provides for tightening up the joints between the piston head and the piston rod as soon as any play tends to develop, in fact, before any play tends to appear, and since my device is actuated by the internal pressure of the cylinder, the greater such internal pressure, and the greater the thrust of the piston head against the piston rod, the more positive the action of my invention.

A feature of my invention is that it may be applied to a piston without requiring any substantial alteration of the piston parts. In my preferred form, I provide a socket member which merely slips over an ordinary hexagonal nut. The fluid-pressure-actuated means carried by this socket member reacts against a second nut which is suitably adjusted on the piston rod and then fixed in its position by a set screw engaging the piston rod. Because of this simple construction, my invention may be manufactured as an accessory to be quickly adapted to any pump already installed; but it is within the purview of my invention to modify or simplify this construction for incorporation in a pump as produced at the factory.

These and other objects and advantages of my invention will be clear from the following detailed description, considered with the attached drawing, in which—

Fig. 1 is a side elevation of a piston head on a piston rod, the piston head being shown in section;

Fig. 2 is an end elevation of Fig. 1;

Fig. 3 is an enlarged end elevation of the socket member carrying the fluid pressure actuated means;

Fig. 4 is a side elevation of Fig. 3; and

Fig. 5 is a vertical section of the fluid pressure actuated mechanism taken in an outward direction as indicated by the lines 5—5 of Fig. 4 and showing, in addition, a portion of the coacting ratchet.

A piston rod 20 carrying a piston head 21 reciprocates within a cylinder 22 indicated by the dotted lines in Fig. 1. Inasmuch as the piston head may be of any of the well-known types and is not itself a feature of this invention, it will not be described in detail. The means of attaching the piston head 21 to piston rod 20 consists of two opposed retaining members, one an inner annular shoulder 23, preferably integral with the piston rod, and the other, an outer adjustable annular member, which may be in the form of a nut 24 screw-threadedly engaging the outer threaded portion 25 of the piston rod. These two annular retaining members present opposed beveled surfaces 26 and 27, respectively, which engage opposite ends of axial bore 28 of piston head 21. The outer end 29 of nut 24 is hexagonal in cross-section.

The automatic means for urging nut 24 towards piston head 21 comprises a fixed annular ratchet 30 and a fluid-pressure-actuated mechanism 31 cooperating with ratchet 30 and engaging nut 29 to rotate therewith. Ratchet 30 is in the form of a nut screw-threadedly engaging the piston rod and has an outer hexagonal flange 32. When this ratchet member is suitably adjusted on the threaded portion 25 of the piston rod, it is locked against rotation by a set screw 33 engaging a slot 34 cut longitudinally in the threaded portion 25 of the piston rod.

The fluid-pressure-actuated mechanism proper is housed within a laterally positioned cylinder 35 overhanging the periphery of ratchet 30 and presenting a pawl 36 to cooperate therewith. Cylinder 35 is carried by, and is integral with, a hexagonal cap 37, which is centrally apertured at 38 to loosely fit over the piston rod and which embraces nut 24, so that movements of cylinder 35 laterally with respect to piston rod 20 are transmitted to nut 24 as rotary movement thereof. The construction of the fluid-pressure-actuated mechanism is indicated in Figs. 4 and 5. Cylinder 35 is closed at one end, open at the other end, having a protruding lip 39 at its open end to facilitate assembly of its internal mechanism, and has a longitudinal slot 40 through which pawl 36 extends to engage teeth of ratchet 30. Within cylinder 35 is a reciprocating plunger 41 machined from round stock. Pawl 36 is pivotally attached to plunger 41 within a deep longitudinal slot 42. Slot 42 has a recess 43 seating a helical expansile spring 44 which serves to continuously press pawl 36 towards ratchet 30. The inner end 45 of plunger 41 is reduced to form annular shoulder 46 and is terminally threaded to receive nut 45a. A piston head 47, preferably of rubber, shaped with annular flanges 47a extending in both directions longitudinally along the inner wall of cylinder 35, has a tubular metal core 48 by which it is mounted on plunger 41. The core is provided with suitable packing rings 49 at each end and is held between nut 45a and shoulder 46. It is clear that the piston head is mounted to serve as a movable fluid-tight seal, proof against leakage in either direction. Piston head 47 and the closed end of cylinder 35 define a closed compression chamber 50 which is spanned longitudinally by a helical expansile spring 51 which engages the end 45 of plunger 41 and seats in a recess 52 in the closed end of the cylinder.

My invention takes advantage of the fact that whether the piston is part of an engine or a pump there is a rhythmical variation of the pressure within cylinder 22. The operation of the fluid-pressure-actuated mechanism may be understood by considering plunger 41 movable with respect to cylinder 35 under external fluid pressure against piston head 47, or by considering cylinder 35 as being movable with respect to plunger 41, the thrust of the cylinder towards the plunger being accounted for by the pressure on the closed end of the cylinder less the pressure on the rim of the open end; or the closed chamber 50 may be considered as tending to contract and expand under variations in pressure external thereto, thereby causing movement of the cylinder 35 and the plunger 41 relatively to each other. In any case, it is apparent that fluid pressure causes the plunger to move towards the closed end of the cylinder and that this movement is opposed both by spring 51 and by the compression of air which fills chamber 50, and that when external pressure decreases the interal forces act in a direction to separate the plunger from the cylinder.

The forces acting on the moving parts are transmitted by pawl 35 to the fixed rachet 30, movements of the plunger and the piston relative to each other causing the pawl to impinge against a rachet tooth. The effect of the pawl impinging against the tooth is to cause the fluid-pressure-actuated mechanism to interact between nut 24 and rachet 30; and since the rachet is fixed against rotation, pressure exerted by pawl 36 against the ratchet tooth is conveyed to nut 24 as a force tending to rotate nut 24 into tighter engagement with piston head 21. When pressure against rachet 30 is withdrawn, nut 24 does not retreat from any advance it has made because the force transmitted by piston head 21 is exerted across the thread of the nut. Consequently, as plunger 41 and the closed end of cylinder 35 move further apart, the lower end of pawl 36 is dragged up the outer surface of a tooth, and, if moved far enough, will engage the rachet at a new point when the plunger and the closed end of the cylinder again move towards each other. A great number of successive reciprocations of the pawl will ordinarily be on the surface of one tooth, the range of movement gradually extending up the tooth until the rachet drops into a new notch. Pawl 36 impinges upon the outer end of notch 40 to limit the outward movement of the plunger, and before the plunger may be withdrawn from cylinder 35, it is necessary to press the pawl inward to clear the cylinder wall. In assembling the form of my invention shown in the drawing, it is necessary to retract pawl 36 until rachet 30 is adjusted adjacent socket member 37.

The preferred form of my invention, described for the purpose of illustration and complete disclosure, suggests a wide range of modifications in structure and form. I reserve the right to all such modifications that properly come within the scope of the claims appended hereto.

Having described my invention, I claim:

1. The combination of: a piston rod; a member axially movable on the rod; and means cooperatively associated with said movable member and piston rod, and movable with the rod, adapted to be actuated by fluid pressure, to move said member axially on the rod.

2. The combination of: a piston rod; a member fixed relative to the piston rod; a member axially movable on the rod; and means cooperatively associated with said fixed member and said axially movable member, and movable with the rod, adapted to be actuated by fluid pressure, to move said axially movable member relative to the rod.

3. The combination of: a piston rod; a nut screw-threadedly mounted on the piston rod; and means cooperatively associated with the nut and piston rod and movable with the piston rod, adapted to be actuated by fluid pressure, to rotate the nut.

4. The combination of: a piston rod; a nut screw-threadedly mounted on the piston rod; a member fixed relative to the piston rod; and means cooperatively associated with the nut and fixed member, adapted to be actuated by fluid pressure, to rotate the nut.

5. The combination of: a cylinder; a piston in the cylinder having a piston rod; a retaining member axially movably engaging the piston rod, adapted to contact with the piston, to limit axial movement of the piston relative to the rod; and means cooperatively associated with the retaining member and piston rod, adapted to be actuated by fluid pressure within the cylinder, to move the retaining member in a direction of increasingly tighter contact with the piston.

6. The combination of: a cylinder; a piston in the cylinder having a piston rod; a member fixed relative to the piston rod; a retaining member axially movably engaging the piston rod, adapted to contact with the piston, to limit axial movement of the piston relative to the rod; and means cooperatively associated with the retaining member and the fixed member, adapted to be actuated by fluid pressure within the cylinder, to move the retaining member in a direction of increasingly tighter contact with the piston.

7. The combination of: a cylinder; a piston in the cylinder having a piston rod; a nut screw-threadedly mounted on the rod to engage the piston, to limit axial movement of the piston relative to the rod; and means cooperatively associated with the nut and piston rod, and movable with the piston rod, adapted to be actuated by fluid pressure within the cylinder, to rotate the nut towards tightening position.

8. The combination of: a cylinder; a piston in the cylinder having a piston rod; a member fixed relative to the piston rod; a nut screw-threadedly mounted on the rod to engage the piston, to limit axial movement of the piston relative to the rod; and means cooperatively associated with the fixed member and nut, movable with the rod, adapted to be actuated by fluid pressure within the cylinder, to rotate the nut towards tightening position.

9. The combination of: a piston rod; a member axially movable on the rod; and means cooperatively associated with said movable member and piston rod, and movable with the rod, adapted to be actuated by fluid pressure, to move said member axially on the rod, said means including a pawl and ratchet mechanism.

10. The combination of: a piston rod; a member fixed relative to the piston rod; a member axially movable on the rod; and means cooperatively associated with said fixed member and said axially movable member, and movable with the rod, adapted to be actuated by fluid pressure, to move said axially movable member relative to the rod, said means including a pawl and ratchet mechanism.

11. The combination of: a piston rod; a nut screw-threadedly mounted on the piston rod; and means cooperatively associated with the nut and piston rod and movable with the piston rod, adapted to be actuated by fluid pressure, to rotate the nut, said means including a pawl and ratchet mechanism.

12. The combination of: a piston rod; a nut screw-threadedly mounted on the piston rod; a member fixed relative to the piston rod; and means cooperatively associated with the nut and fixed member, adapted to be actuated by fluid pressure, to rotate the nut, said means including a pawl and ratchet mechanism.

13. The combination of: a cylinder; a piston in the cylinder having a piston rod; a retaining member axially movably engaging the piston rod, adapted to contact with the piston, to limit axial movement of the piston relative to the rod; and means cooperatively associated with the retaining member and piston rod, adapted to be actuated by fluid pressure within the cylinder, to move the retaining member in a direction of increasingly tighter contact with the piston, said means including a pawl and ratchet mechanism.

14. The combination of: a cylinder; a piston in the cylinder having a piston rod; a member fixed relative to the piston rod; a retaining member axially movably engaging the piston rod, adapted to contact with the piston, to limit axial movement of the piston relative to the rod; and means cooperatively associated with the retaining member and the fixed member, adapted to be actuated by fluid pressure within the cylinder, to move the retaining member in a direction of increasingly tighter contact with the piston, said means including a pawl and ratchet mechanism.

15. The combination of: a cylinder; a piston in the cylinder having a piston rod; a nut screw-threadedly mounted on the rod to engage the piston, to limit axial movement of the piston relative to the rod; and means cooperatively associated with the nut and piston rod, and movable with the piston rod, adapted to be actuated by fluid pressure within the cylinder, to rotate the nut towards tightening position, said means including a pawl and ratchet mechanism.

16. The combination of: a cylinder; a piston in the cylinder having a piston rod; a member fixed relative to the piston rod; a nut screw-threadedly mounted on the rod to engage the piston, to limit axial movement of the piston relative to the rod; and means cooperatively associated with the fixed member and nut, movable with the rod, adapted to be actuated by fluid pressure within the cylinder, to rotate the nut towards tightening position, said means including a pawl and ratchet mechanism.

17. The combination of: a cylinder adapted to confine fluid under pressure; a longitudinally reciprocating piston rod extending into the cylinder; a piston head carried by the piston rod in sliding contact with the cylinder; a retaining member movably engaging the piston rod to secure the piston head thereon; and means actuated by fluid-pressure within the cylinder to move said retaining member against the piston head.

18. The combination of: a cylinder adapted to confine fluid under pressure; a longitudinally reciprocating piston rod extending into the cylinder; a piston head carried by the piston rod in sliding contact with the cylinder; a nut screw-threadedly engaging the piston rod and securing the piston head thereon; and automatic means actuated by the fluid pressure within the cylinder to revolve the nut towards the piston head.

19. The combination of: a cylinder adapted to confine fluids under pressure; a longitudinally reciprocating piston rod extending into the cylinder; a piston head carried by the piston rod in sliding contact with the cylinder; a nut screw-threadedly engaging the piston rod to secure the piston head thereon; a member rigidly fixed to the piston rod adjacent the nut; and means interacting between the nut and the fixed member to rotate the nut, said means being adapted to be actuated by fluid pressure within the cylinder.

20. The combination of: a cylinder adapted to confine fluids under pressure; a longitudinally reciprocating piston rod extending into the cylinder; a piston head carried by the piston rod in sliding contact with the cylinder; a nut screw-threadedly engaging the piston rod and securing the piston head thereon; a member rigidly fixed to the piston rod; a pawl and rachet mechanism adapted to exert rotative stress between the fixed member and the nut; and means actuated by the fluid pressure within the cylinder adapted to operate the pawl and rachet mechanism.

21. The combination of: a cylinder adapted to confine fluids under pressure; a longitudinally reciprocating piston rod extending into the cylinder; a piston head carried by the piston rod in sliding contact with the cylinder; a nut screw-threadedly engaging the piston rod and securing the piston head thereon; a member rigidly fixed to the piston rod; a second member engaging the nut to rotate therewith; and fluid pressure actuated means actuated by the pressure within the cylinder and adapted to interact between the two members, whereby the second member rotates the nut on the piston rod towards the piston head.

22. The combination of: a cylinder adapted to confine fluids under pressure; a longitudinally reciprocating piston rod extending into the cylinder; a piston head carried by the piston rod in sliding contact with the cylinder; a nut screw-threadedly engaging the piston rod to secure the piston head thereon; a member rigidly fixed to the piston rod; a socket member engaging the nut to rotate therewith; a pawl and rachet mechanism adapted to interact between the fixed member and the socket member to rotate the socket member and thereby the nut; and fluid pressure actuated means for operating the pawl and rachet mechanism, such means being adapted to be actuated by fluid pressure within the cylinder.

23. The combination of: a pressure chamber confining fluid under fluctuating pressure; a rod extending into the chamber; an annular rachet fixedly mounted on the rod; a nut screw-threadedly engaging the rod in the chamber; a cylinder mounted on the nut; a piston slidingly mounted in the cylinder and adapted to reciprocate in response to pressure fluctuations in the chamber; and a pawl operatively connected to the piston and adapted to engage the annular rachet, thereby rotating the nut.

24. The combination of: a cylinder confining fluid under fluctuating pressures; a longitudinally reciprocating piston rod extending into the cylinder; a piston head carried by the piston rod in sliding contact with the cylinder; a nut screw-threadedly engaging the piston rod to secure the piston head thereon; a small cylinder mounted on the nut; a small piston slidingly mounted in the small cylinder and adapted to reciprocate in response to pressure fluctuations in the surrounding fluid; and a pawl and rachet mechanism associated with the piston rod that carries the nut and with the small piston, whereby the small piston interacts with the piston rod.

25. The combination of: a cylinder confining fluid under fluctuating pressures; a longitudinally reciprocating piston rod extending into the cylinder; a piston head carried by the piston rod in sliding contact with the cylinder; a nut screw-threadedly engaging the piston rod to secure the piston head thereon; a rachet fixedly mounted on the piston rod; a small cylinder mounted on the nut; a small piston slidingly mounted in the small cylinder and adapted to reciprocate in response to pressure fluctuations in the surrounding fluid; and a pawl operatively connected to the small piston and positioned to engage the rachet.

26. The combination of: a piston rod; a nut screw-threadedly mounted on the piston rod; a pawl-and-ratchet mechanism between the nut and the piston rod; and means associated with the pawl-and-ratchet mechanism actuated by fluctuating fluid pressure associated with reciprocations of the piston rod, whereby rotative stress is exerted against the nut upon each movement of the piston rod in one direction.

27. The combination of: a piston rod; a nut screw-threadedly mounted on the piston rod; a ratchet associated with the piston rod; a pawl associated with the nut; and means actuated by fluctuating fluid pressure associated with reciprocations of the piston rod, whereby the pawl is pressed into rotative engagement with the ratchet upon each movement of the piston rod in one direction.

JOHN W. McQUAID.